Jan. 16, 1962     C. B. HAAS     3,016,868
MAGNETIC MINESWEEPING EQUIPMENT
Filed March 29, 1960
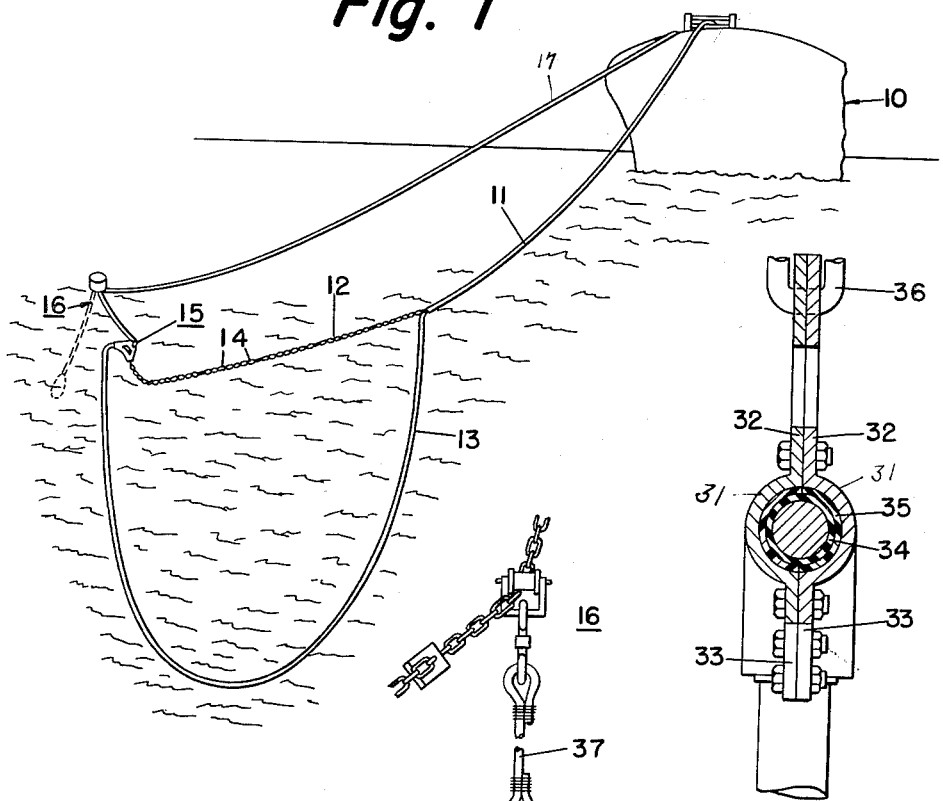
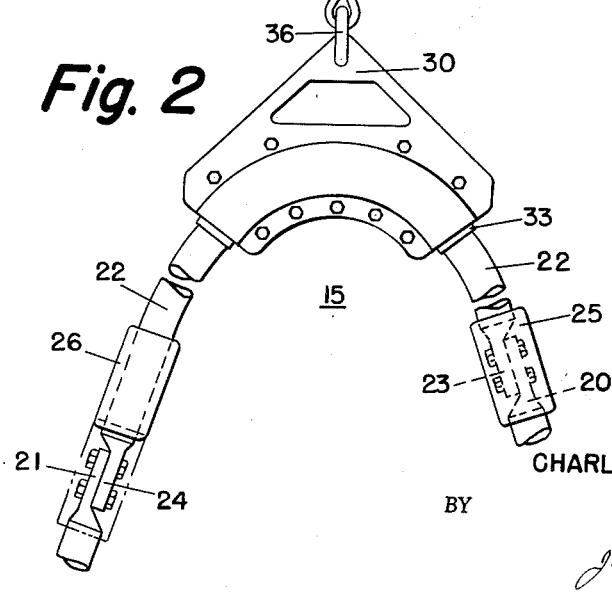
INVENTOR.
CHARLES B. HAAS
BY
*J. F. Shehan*
ATTORNEY

United States Patent Office 3,016,868
Patented Jan. 16, 1962

3,016,868
MAGNETIC MINESWEEPING EQUIPMENT
Charles B. Haas, Crownsville, Md.
Filed Mar. 29, 1960, Ser. No. 18,459
2 Claims. (Cl. 114—235)
(Granted under Title 35, U.S. Code (1952), sec. 266)

The invention described herein may be manufactured and used by or for the Government of the United States of America for governmental purposes without the payment of any royalties thereon or therefor.

This invention relates to mine searching or sweeping and particularly to such apparatus involving the use of electrical cables for providing a magnetic field in the ocean zones being searched.

In general, mine searching or sweeping apparatus requires the use of wire sweep lines which are arranged to travel near or at a selected depth below the ocean surface and are payed out from a search vessel. To achieve a desired configuration, the sweep lines are maintained in looped or expanded shape by means of diverting gear or equipment, which consists of various arrangements of floats, otters or kites, etc., and as the line is payed out from the vessel it acquires a desired expanded shape or configuration. Various means may be carried by the sweep line for the purpose of retrieving or removing a mine.

In magnetic minesweeping, to which this invention is directed, the sweep line is formed of electrical conductors and consequently a number of problems are presented in making the various connections between the electrical conductors and the mechanical elements of the diverting gear since the various connections must be waterproof in order to prevent shorting of the conductors. In using magnetic minesweeping equipment, the diverting gear is arranged to maintain the conductors in suitable or desired configurations on or slightly below the ocean surface by a float arrangement while the otters and kites, etc., are cooperatively arranged to provide the desired configuration of the conductors. Additionally, tow ropes, shackles and pulleys are required for the sweeping equipment and it all becomes quite bulky, cumbersome to handle and often is a hazard to personnel who are required to assemble or disassemble the equipment before and after it is used. A greater appreciation of the trouble encountered in handling the magnetic towing equipment will be apparent from the fact that the electrical conductors may be of upwardly of 2000 feet in length, and this in addition to the required diverting and connecting gear amounts to such bulk or weight that it is necessary to form the equipment in separable sections or independent units in order that the equipment may be manually assembled or disassembled.

In the general arrangement of the magnetic sweeping equipment, one section will be understood to comprise the electrical side and the other the mechanical side. The electrical side consists of some float arrangement which extends lengthwise of the electrical conductor which is floated. The electrical side of magnetic equipment heretofore in general use has been interconnected by means of a "bridle" which is composed of a section of wire rope to mechanically connect the diverting gear and conductor line for making the electrical connection for the electrical conductor. With this arrangement, the connections between the electrical conductors and diverting gear have to be wrapped with tape to provide proper waterproofing and insulation which further adds to the time and physical efforts required in assembling and disassembling the equipment when it is put into use and when placed in stowage on the vessel deck.

The principal object of the invention is to provide magnetic minesweeping equipment which is formed of readily assembled and disassembled sections.

Another object of the invention is to provide an adaptor for readily connecting the mechanical and the electrical side of magnetic minesweeping equipment.

A more specific object is to provide an adaptor unit which is shaped to provide a pair of cooperating connectors for readily receiving the electrical conductors of magnetic towing equipment and an independent connector therebetween for readily receiving the diverting equipment.

Referring to the drawings:

FIG. 1 is a schematic view showing one arrangement of magnetic minesweeping equipment payed out from a search vessel and in minesweeping position.

FIG. 2 is a detail of a portion of FIG. 1.

FIG. 3 is a vertical sectional view to show some details of FIG. 2.

In FIG. 1, a towing vessel is indicated at 10 and has extending therefrom an electrical cable 11 which is separated into or forms branches 12 and 13 and provides the electrical conductors. The branch conductor 12, as shown, is provided with a series of spaced segmented floats indicated at 14 while the branch conductor 13 is provided interiorly with a float structure (not shown) which is generally rigid to give this conductor a looped or expanded configuration as indicated. The outer ends of each of the electrical conductor branches 12 and 13 are each connected to an adaptor 15 which in turn is connected to the diverting equipment indicated generally at 16. Batteries or generators (not shown) are provided on the vessel deck for energizing the cable 11 and the conductors 12 and 13 and suitable reel means will be provided for mounting the cable 11 and from which it is payed out. At 17 is indicated a tow line which is connected to the diverting gear for moving or repositioning the entire equipment in order to relocate it as desired.

In FIG. 2, is shown generally the adaptor 15 of the invention connected to the electrical conductors 12 and 13, each conductor, as shown, being provided with end connectors 20 and 21 which are preferably in the form of apertured flat lugs. The adaptor is constructed of an inner conductor section 22, which may be copper rope strand material or other flexible conductor material and has flat end connectors 23 and 24 generally similar to the lugs 20 and 21 of the conductor branches 12 and 13 and to which they are respectively connected by bolt connections as shown. Each of the interconnected ends are provided with covering in the form of sleeves 25 and 26 which are secured about the lugs in tight fitting engagement for waterproofing and insulating the connected ends.

The adaptor 15 is provided with a yoke or brace which is formed of two similar plates 30, shown in detail in FIG. 3, and functions to maintain the flexible conductor strand 22 in the generally arcuate shape of FIG. 2 and also to provide a connection for the diverting gear 16. Each plate has a concave section 31 which is curved or arcuate in shape and when the plates are fitted together, the concave sections provide a receptacle for receiving a central portion of conductor strand 22 and the sections 31 extend over or enclose the central portion and the conductor strand is thereby bent upon itself to provide diverging portions. A flange 32 and a flange 33 are provided on either side of the concave portions 31 and are bolted, as shown, to provide a rigid structure. Between the conductor section 22 and the concave portions 31 of the plates insulation is provided and comprises a sheath of fabric 34 which is disposed directly about the conductor 22 and a layer of neoprene rubber 35 disposed about the fabric. The flanges 32 provide an attaching end for the adaptor to receive the diverting equipment and to this end a connecting link 36 is secured in an aperture in the flanges 32 for receiving linkage 37 to which is attached the diverting equipment indicated generally at 16.

It will be understood that the adaptor of this invention is constructed of a strand of flexible conductor material which is provided with a yoke or brace between its ends, and generally in its central portion which has a generally arcuately shaped receiving portion for the conductor and provides the conductor with two diverging arms. And it will be further understood that the brace or yoke has a connecting portion for securing the diverting or mechanical equipment and which extends from the central portion of the conductor in a direction generally opposite to the general direction of the diverging arms of the conductor.

What is claimed is:

1. Minesweeping apparatus of the magnetic type comprising an electrical cable terminating in a pair of branch conductors each having a fixed inner end and a free outer end and which are payed out from a surface vessel onto the ocean surface, one of said branch conductors being generally rigid and of open loop shape and the other of said branch conductors being buoyant, in combination with an adaptor formed of a rigid brace having an arcuate passageway between its ends, an arcuate conductor in said passageway providing diverging end portions, each of said end portions forming a connector means, one of said connector means receiving the free end of one branch conductor and the other connector means receiving the free end of the other branch conductor and forming a closed loop conductor structure, said brace having an attaching portion generally centrally thereof and which is disposed between and diametrically opposite its diverging ends, and a link on said attaching portion receiving a tow line which is manipulable from the surface vessel for positioning the closed loop conductor structure as desired.

2. Minesweeping apparatus of the magnetic type comprising an electrical cable terminating in a pair of branch conductors each having a fixed inner end and a free outer end and which are payed out from a surface vessel onto the ocean surface, one of said branch conductors being generally rigid and of open loop shape and the other of said branch conductors being buoyant, in combination with an adaptor formed of a rigid brace having an arcuate passageway between its ends, an arcuate conductor extending through said passageway and having end portions exteriorly of the passageway and disposed in diverging relation, each of the arcuate conductor end portions having a connector means, one of said connector means receiving the free end of one branch conductor and the other connector means receiving the free end of the other branch conductor and forming a closed loop conductor structure, said brace having an attaching portion generally centrally thereof and which is disposed between and diametrically opposite its diverging ends, and a link on said attaching portion receiving a tow line which is manipulable from the surface vessel for positioning the closed loop conductor structure as desired.

References Cited in the file of this patent

UNITED STATES PATENTS

| | | |
|---|---|---|
| 743,346 | Swain | Nov. 3, 1903 |
| 2,170,481 | Morrison et al. | Aug. 22, 1939 |
| 2,353,360 | Ronning | July 11, 1944 |
| 2,708,299 | Stetcher | May 17, 1955 |
| 2,783,297 | Badeau | Feb. 26, 1957 |